United States Patent [19]
Brede et al.

[11] Patent Number: 5,746,026
[45] Date of Patent: May 5, 1998

[54] METHOD FOR UNLOCKING A WINDOW PANE OF A RAILROAD CAR WITH AN INFLATABLE PRESSURE TUBE

[75] Inventors: Uwe Brede; Anton Bretfeld; Joachim Fibranz, all of Furth; Gerhard Kordel, Nuremberg; Josef Kraft, Berg; Peter Lehniger, Erlangen; Jens-Peter Reimer, Herzogenaurach, all of Germany

[73] Assignee: Dynamit Nobel Aktiengesellschaft, Troisdorf, Germany

[21] Appl. No.: 683,630

[22] Filed: Jul. 15, 1996

[30] Foreign Application Priority Data

Jul. 15, 1995 [DE] Germany .................... 195 25 833.9
Dec. 1, 1995 [DE] Germany .................... 195 44 886.3

[51] Int. Cl.$^6$ ............................................. E06B 3/00
[52] U.S. Cl. ................................. 49/506; 49/141
[58] Field of Search .................. 49/141, 506, 477.1, 49/379; 105/348, 349

[56] References Cited

U.S. PATENT DOCUMENTS

| | | | |
|---|---|---|---|
| 3,150,749 | 9/1964 | Robrecht et al. | 49/141 |
| 3,442,048 | 5/1969 | Elias | 49/141 |
| 3,737,193 | 6/1973 | Cain | 49/141 X |
| 4,635,396 | 1/1987 | Ranz et al. | 49/141 |
| 4,978,089 | 12/1990 | Alquier et al. | 49/141 X |

*Primary Examiner*—Jerry Redman
*Attorney, Agent, or Firm*—Antonelli, Terry, Stout, & Kraus, LLP

[57] ABSTRACT

A method for unlocking a window pane secured by a fastening element to a frame element of a window frame, with an inflatable pressure tube being located between the window pane and the frame element, said tube, upon being inflated, forcing the window pane out of the frame element. For reliable and improved element unlocking of the window pane, the pressure tube is inflated by actuation of at least one pyrotechnic gas generator connected to the pressure tube.

10 Claims, 2 Drawing Sheets

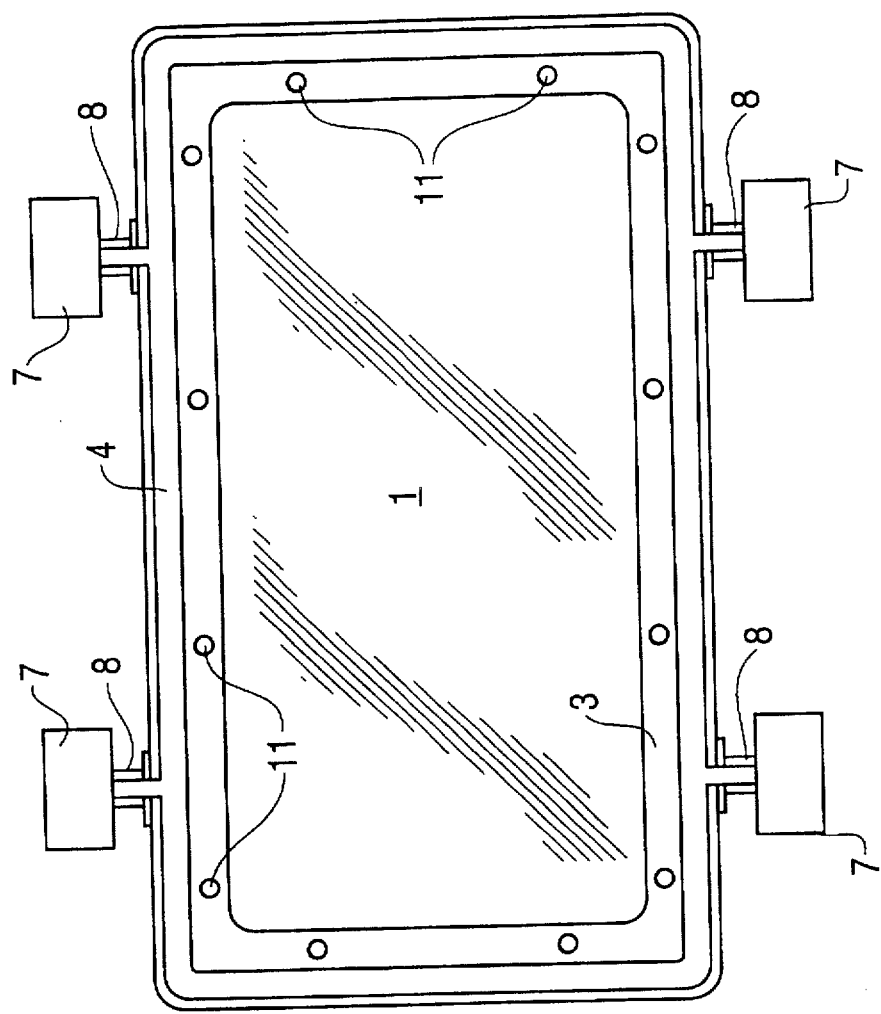
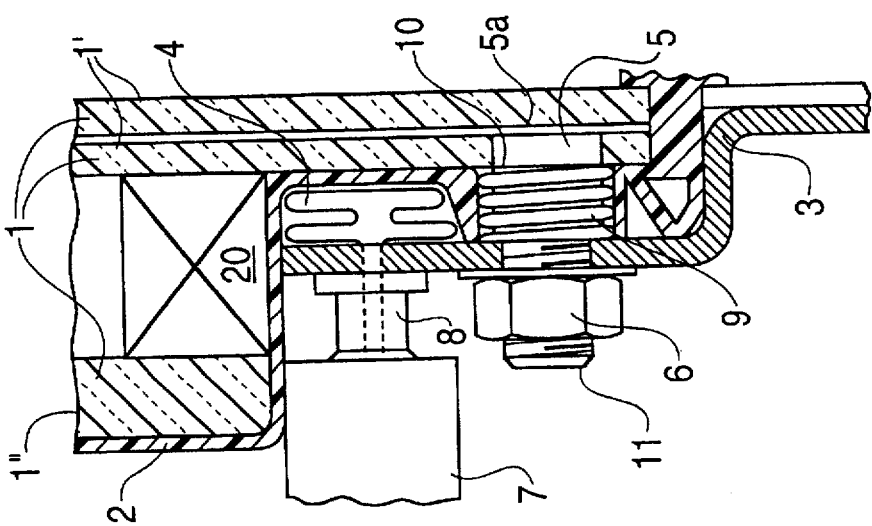

METHOD FOR UNLOCKING A WINDOW PANE OF A RAILROAD CAR WITH AN INFLATABLE PRESSURE TUBE

FIELD OF INVENTION

The invention relates to a method for unlocking a window pane from a window frame of a railroad car or like vehicle with an inflatable pressure tube that separates the window pane from the frame upon actuation of a pyrotechnic gas generator.

Modern railroad cars are frequently equipped with air conditioning systems. This results in a requirement for higher thermal insulation by the windows. In high-speed trains there is also the requirement for good sound insulation and high dynamic strength (entering and exiting tunnels, trains on opposite track). Because of these increased requirements, windows are needed whose stability is so high that they can no longer be broken or opened manually (especially in darkness or in panic situations). In order to meet these requirements, insulated glass windows combined with laminated glass panes are used in modern high-speed trains. In armored motor vehicles this problem is especially serious owing to the use of bulletproof glass.

DE-A1-39 25 430 teaches an unlocking device for a window pane that is connected by a sealing profile with a frame element, with the window pane being fastened to the frame element by a fastening element. A deformable tube fillable with gas is provided in the frame element or on the fastening element, the tube tearing open mounting of the window pane when in the inflated state so that the window pane falls out of the frame element.

SUMMARY OF THE INVENTION

A goal of the invention is to provide an unlocking device for a window pane that has an inflatable pressure tube so arranged that upon inflation, it comprises a simple means providing nearly complete assurance that the window pane will fall out of the frame in an emergency.

This goal is achieved according to the invention in that the pressure tube is inflated when actuated by at least one pyrotechnic gas generator.

Gas generators are produced in large quantities today and are absolutely reliable. In addition, they take up only a very small amount of space so that the generators can be integrated directly into the frame of the window pane. Ignition is performed electrically, either centrally for a plurality of window panes by a control electronic system for example, or decentrally for each window pane separately.

Advantageously, the pressure tube is inflated by more than one gas generator upon actuation. This results in a considerable increase in safety, since if one gas generator fails, the other(s) will take over its function. In an especially advantageous embodiment, the pressure tube is inflated by two gas generators located on each lengthwise side of the window pane.

Each gas generator is advantageously connected by a tubular connecting piece with the pressure tube. According to the invention, however, the pressure tube can also be connected by a plurality of tubular connecting pieces with an single gas generator, for example.

In a preferred embodiment, the window pane is also urged in the ejection direction by a spring. This ensures complete ejection of the window pane, even under unfavorable conditions.

According to the invention, this method can be used advantageously for window panes in railroad cars or in motor vehicles. This method is especially advantageous when the window panes are glued in place, i.e. when the fastening element includes an adhesive bond, since the adhesive bond can be subjected to an excessive load by the mechanical forces that the pressure tube exerts on it. The connection provided by the adhesive bond is thus broken.

BRIEF DESCRIPTION OF THE DRAWINGS

Additional features of the invention will be evident from the accompanying drawings and detailed description wherein:

FIG. 1 is a cross-section of a window pane for railroad cars with an inflatable pressure tube;

FIG. 2 is a schematic plan view of an arrangement of gas generators connected to the pressure tube.

DETAILED DESCRIPTION OF THE INVENTION

Figure 3:
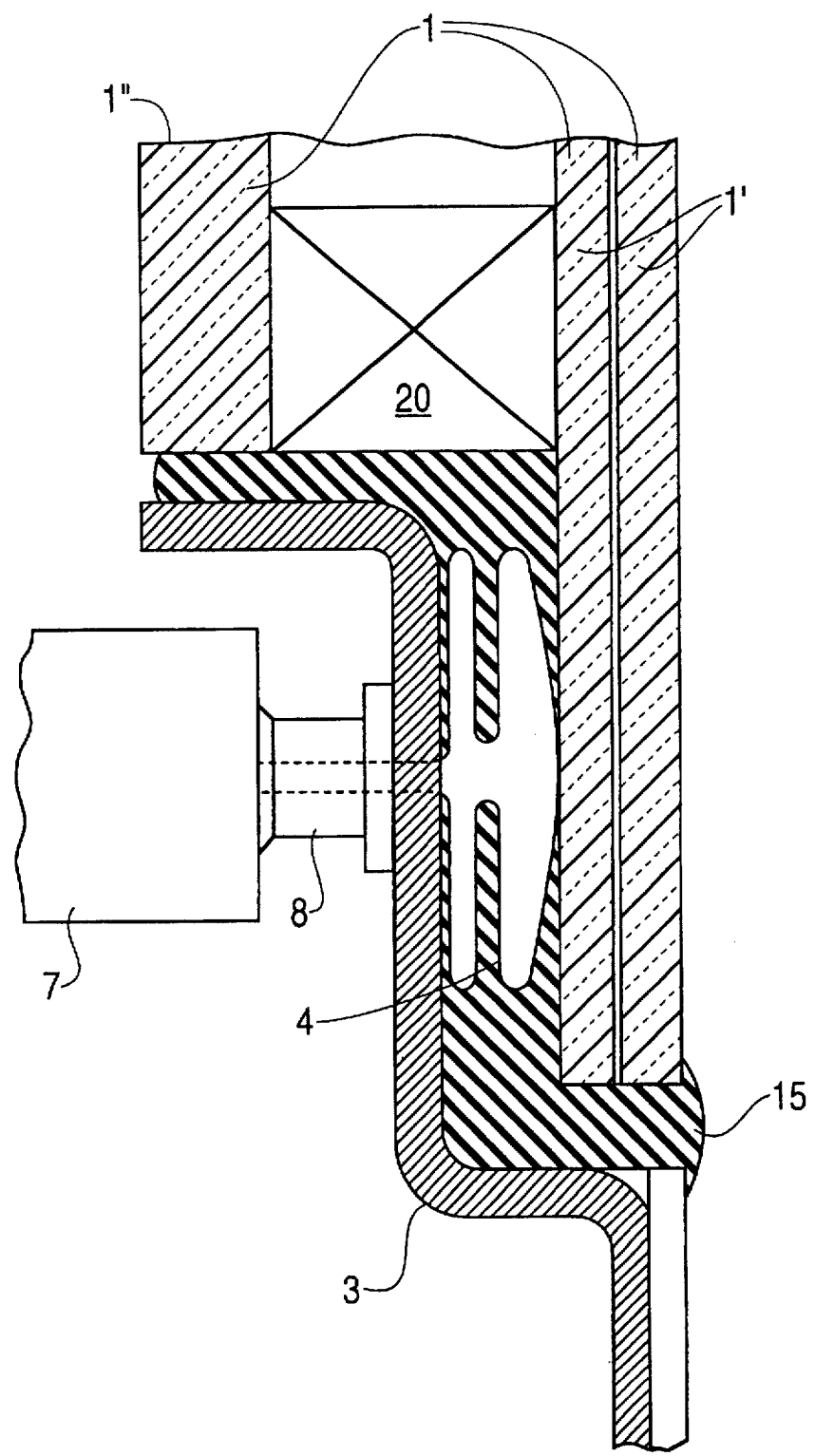
FIG. 3 is a cross-section of a glued-in window pane for railroad cars equipped with an inflatable pressure tube.

FIG. 1 shows an unlocking device with a window pane 1 that comprises a laminated pane made of insulating glass having three sheets of glass. Two laminated glass sheets 1' directed outward are connected with a third sheet 1" by a spacer 20. Window pane 1 is connected with a window frame element 3 by a sealing profile or member 2 made, for example, of an extruded plastic material. The actual fastening is provided by a fastening element that comprises a threaded bolt 5 and a nut 6. Threaded bolt 5 comprises a cylindrical tube with an external thread and an expansion or enlarged portion at one end in the form of a collar 5a. For fastening, the collar-shaped expansion that faces window pane 1 is placed between the laminated sheets 1'. Threaded bolt 5 and hence window pane 1 together with frame element 3 are firmly connected by nut 6 which is screwed onto the thread of threaded bolt 5, since threaded bolt 5 passes through frame element 3 and nut 6 abuts frame element 3 externally by a spacing ring or washer.

For improved ejection of the window pane, threaded bolt 5 is surrounded by a spring 9 that firstly abuts window frame element 3 and secondly abuts a glass sheet of the window pane 1 in the ejection direction.

In another embodiment, the window pane may be glued or bonded according to a known method into the structure of the window frame, e.g., to the frame element, with an adhesive that also assumes sealing functions after curing, and also being able to transmit forces between the frame and the pane.

A folded pressure tube 4 is inserted into a cavity between the frame element 3 and the window pane 1 (as well as the sealing profile 2), the tube being connected by a connecting tubular piece 8 with a pyrotechnic gas generator 7. A gas-generating material is provided in gas generator 7, as is generally conventional, said material, upon ignition by a conventional electrical ignition element, generating a gas under pressure. This pressurized gas passes through tubular connecting piece 8 into the pressure tube 4 and inflates the tube. Since the resultant volume of the pressure tube 4 is larger than the cavity available for the pressure tube 4, the tensile forces acting on threaded bolt 5 break the bolt and tear it free and push window pane 1 out of frame element 3. Advantageously, a scored portion 10 is provided on the threaded bolt 5 so that scored portion 10 breaks upon actuation of the pressure tube and window pane 1 is pushed, unbroken, out of frame element 3.

FIG. 2 shows a preferred arrangement of gas generators 7. Two gas generators 7 are located on each lengthwise side of window pane 1, said generators each being connected by a tubular connecting piece 8 with the pressure tube 4. The fastening element composed of threaded bolt 5 and nut 6 is indicated by reference number 11 (see FIG. 1).

In order to prevent anyone from being injured when window pane 1 is ejected, window pane 1 can be connected with frame element 3 by a holding device, which allows the pane to be displaced from the window frame and still be prevented from falling to the ground. It will be understood that the gas generators 7 are connected to a central electrical control unit which can actuate the gas generator automatically with electrical signals under sudden deceleration of a railroad car or manually by an operator.

FIG. 3 shows an embodiment with a window pane 1, which is glued or bonded into the window frame by an adhesive. The adhesive is designated by reference numeral 15 and is disposed between frame element 3 of the window frame and the pane 1. A pressure tube 4 is embedded in the adhesive 15. Adhesive 15 can also advantageously be provided with a hollow space, so that the hollow space takes over the function of the pressure tube and the pressure tube 4 is unnecessary. When pressurized gas from a gas generator penetrates this hollow space or the pressure tube 4, the space or tube expands and the pane 1 is separated from or squeezed out of the frame element 3. The other reference numerals in FIG. 3 relate to the same elements as shown in FIG. 1.

A silicone rubber or resin material may, for example, serve as the adhesive 15.

What is claimed is:

1. A method for unlocking a window pane, fastening element connects the window pane to a frame element of a window frame, with an inflatable pressure tube being located between the window pane and the frame element, which comprises actuating at least one pyrotechnic gas generator to generate a gas under pressure;

passing the gas under pressure to the inflatable pressure tube; and inflating the inflatable pressure tube with the gas under pressure which releases the fastening element from the window pane thereby unlocking the window pane from the frame element.

2. A method according to claim 1, comprising actuating at least two gas generators, one located on each lengthwise side of the window pane, passing the gas under pressure from the at least two gas generators to the inflatable pressure tube, thereby inflating the inflatable pressure tube with gas under pressure from the at least two gas generators.

3. A method according to claim 2, wherein the inflatable pressure tube is connected by at least one tubular connecting piece with each of the at least two gas generators.

4. A method according to claim 1, wherein the inflatable pressure tube is connected by at least one tubular connecting piece with the gas generator.

5. A method according to claim 1, further comprising urging the window pane in an ejection direction by a spring positioned between the frame element and the window pane.

6. A method according to claim 1, wherein in that the fastening element is an adhesive located between the frame element and the window pane.

7. A method for unlocking a plurality of window panes located on a railroad car, a fastening element connects each of the plurality of window panes to a frame element of a window frame, with an inflatable pressure tube being located between each of the plurality of window panes and the frame element, which comprises actuating a plurality of pyrotechnic gas generators to generate gas under pressure, at least one pyrotechnic gas generator being connected to each inflatable pressure tube of each of the plurality of window panes; passing the gas under pressure from each of the plurality of pyrotechnic gas generators to respective inflatable pressure tubes; and inflating the inflatable pressure tubes with the gas under pressure which releases the fastening element of each of the plurality of window panes, thereby unlocking each of the plurality of window panes from its respective frame element.

8. A method according to claim 7, wherein a plurality of pyrotechnic gas generators are connected to each inflatable pressure tube.

9. A method for unlocking a plurality of window panes located on a motor vehicle, a fastening element connects each of the plurality of window panes to a frame element of a window frame, with an inflatable pressure tube being located between each of the plurality of window panes and the frame element, which comprises actuating a plurality of pyrotechnic gas generators to generate gas under pressure, at least one pyrotechnic gas generator being connected to each inflatable pressure tube of each of the plurality of window panes; passing the gas under pressure from each of the plurality of pyrotechnic gas generators to respective inflatable pressure tubes; and inflating the inflatable pressure tubes with the gas under pressure which releases the fastening element of each of the plurality of window panes, thereby unlocking each of the plurality of window panes from its respective frame element.

10. A method according to claim 9, wherein a plurality of pyrotechnic gas generators are connected to each inflatable pressure tube.

* * * * *